US008804585B2

(12) United States Patent
Dayal et al.

(10) Patent No.: US 8,804,585 B2
(45) Date of Patent: Aug. 12, 2014

(54) SPECIAL MANAGEMENT CONNECTION BETWEEN BASE STATION AND RELAY STATIONS IN MULTIHOP RELAY SYSTEMS FOR CONTROLLING SLEEP-MODE

(75) Inventors: Pranav Dayal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 12/351,794

(22) Filed: Jan. 9, 2009

(65) Prior Publication Data

US 2010/0177672 A1 Jul. 15, 2010

(51) Int. Cl.
*G08C 17/00* (2006.01)
*H04B 7/204* (2006.01)

(52) U.S. Cl.
USPC .............. 370/311; 455/13.4; 455/343.2

(58) Field of Classification Search
USPC ............. 370/311; 455/13.4, 15, 343.2–343.6, 455/127.5, 571–573
See application file for complete search history.

(56) References Cited

U.S. PATENT DOCUMENTS

| 8,009,645 | B2 * | 8/2011 | Lee et al. ...................... 370/338 |
| 2004/0097254 | A1 * | 5/2004 | Laroia et al. .................. 455/522 |
| 2008/0031174 | A1 * | 2/2008 | Saifullah et al. .............. 370/311 |
| 2009/0016290 | A1 * | 1/2009 | Chion et al. .................. 370/329 |
| 2009/0036050 | A1 * | 2/2009 | Min et al. ........................ 455/7 |
| 2009/0197624 | A1 * | 8/2009 | Kwak et al. ................... 455/517 |
| 2010/0157826 | A1 * | 6/2010 | Yu et al. ......................... 370/252 |
| 2010/0238892 | A1 * | 9/2010 | Dahlman et al. .............. 370/329 |
| 2010/0260088 | A1 * | 10/2010 | Jeon ............................... 370/312 |
| 2010/0260095 | A1 * | 10/2010 | Youn et al. .................... 370/315 |
| 2011/0256827 | A1 * | 10/2011 | Hart ................................... 455/9 |
| 2013/0052996 | A1 * | 2/2013 | Sun et al. ...................... 455/411 |

FOREIGN PATENT DOCUMENTS

| CN | 101138263 A | 3/2008 |
| EP | 1701490 | 9/2006 |
| JP | 2008532454 A | 8/2008 |
| KR | 20080040545 | 5/2008 |
| WO | WO2008004099 | 1/2008 |
| WO | WO2008004806 | 1/2008 |
| WO | WO2008054150 | 5/2008 |
| WO | WO2009057947 | 5/2009 |

OTHER PUBLICATIONS

International Search Report and Written Opinion—PCT/US2010/020570, International Search Authority—European Patent Office—Jul. 28, 2010.

(Continued)

*Primary Examiner* — Habte Mered
(74) *Attorney, Agent, or Firm* — Tyler J. Overall

(57) ABSTRACT

The present disclosure proposes different methods of utilizing dedicated control channels in a multi-hop relay system. For one embodiment of the present disclosure, dedicated control channels may be used to power control communication entities in the multi-hop relay system. For another embodiment of the present disclosure, bandwidth resources of dedicated control channels may be employed to control a sleep mode at a subscriber station. For yet another embodiment of the present disclosure, dedicated control channels of the multi-hop relay system may be exploited for sending multicast and broadcast service messages.

8 Claims, 11 Drawing Sheets

(56) References Cited

OTHER PUBLICATIONS

Nakatsugawa K: "A proposal for synchronous MBS transmission in MR" IEEE C802.16J-07/005R3, [Online] Jan. 18, 2007, pp. 1-6, XP002525221 Retrieved from the Internet: URL:http://www.ieee802.org/16/relay/contri b/C80216j-07_005r3.pdf> [retrieved on Jan. 18, 2007] figures 3,4 and pp. 4-6.

Yang, Liu, et al., "Synchronous MBS Transmission for Macro Diversity in MR Networks," Internet Citation from IEEE 802.16 Broadband Wireless Access Working Group;(Jul. 5, 2007), pp. 1-9, XP002518223, Retrieved from the Internet: <URL:http://wirelessman.org/relay/contrib/C80216j-07_446r3.doc>[retrieved on Feb. 6, 2009] pp. 2,6.

Taiwan Search Report—TW099100604—TIPO—May 19, 2013.

* cited by examiner

SPECIAL MANAGEMENT CONNECTION BETWEEN BASE STATION AND RELAY STATIONS IN MULTIHOP RELAY SYSTEMS FOR CONTROLLING SLEEP-MODE

TECHNICAL FIELD

The present disclosure generally relates to communication and more specifically to different methods for utilizing dedicated control channels in multi-hop relay systems.

SUMMARY

Certain embodiments provide a method for controlling transmission power by a base station (BS) in a multi-hop relay system. The method generally includes receiving channel quality information (CQI) of one or more downlink channels that correspond to one or more uplink channels power-controlled by the BS from a relay station (RS) closest to the BS using dedicated uplink control channel, and sending one or more power-control messages, based on received CQI, for one or more of the uplink channels to the closest RS using a dedicated downlink control channel.

Certain embodiments provide a method for controlling transmission power by a relay station (RS) in a centralized multi-hop relay system. The method generally includes sending channel quality information (CQI) of one or more downlink channels that correspond to one or more uplink channels power-controlled by a base station (BS) to the BS via one or more dedicated uplink control channels, receiving, from the BS, one or more uplink channel power-control messages for one or more uplink channels power-controlled by the BS, and relaying the one or more uplink channel power-control messages to sub-ordinate relay stations and to a subscriber station (SS) via one or more dedicated downlink control channels.

Certain embodiments provide a method for controlling a transmission power by a relay station (RS) in a distributed multi-hop relay system. The method generally includes sending channel quality information (CQI) of one or more downlink channels that correspond to one or more uplink channels power-controlled by a super-ordinate RS to the super-ordinate RS using dedicated uplink control channel, receiving one or more uplink channel power-control messages for one or more uplink channels power-controlled by the super-ordinate RS from the super-ordinate RS using dedicated downlink control channel, and relaying the one or more uplink channel power-control messages for one or more uplink channels power-controlled by the super-ordinate RS to at least one of a sub-ordinate relay station via a dedicated downlink control channel.

Certain embodiments provide a method for controlling a sleep mode of a subscriber station (SS) in a multi-hop relay system. The method generally includes sending a mobile sleep request message to a base station (BS) requesting an entry to the sleep mode via one or more relay stations using dedicated uplink control channels, receiving a mobile sleep response message sent from the BS via the one or more relay stations using dedicated downlink control channels, and entering the sleep mode at the SS according to information contained in the received mobile sleep response message.

Certain embodiments provide a method for controlling a sleep mode of a subscriber station (SS) in a multi-hop relay system. The method generally includes receiving a mobile sleep request message sent from the SS for requesting an entry to the sleep mode via one or more relay stations using dedicated uplink control channels, and sending from the BS a mobile sleep response message to the SS via the one or more relay stations using dedicated downlink control channels.

Certain embodiments provide a method for performing multicast and broadcast services in a multi-hop relay system. The method generally includes receiving at a base station (BS) subscriber station basic capability request messages from every relay station (RS) in the multi-hop relay system via dedicated uplink control channels, determining at the BS a maximum cumulative delay of every RS in the multi-hop relay system based on information about their positions and processing delays contained in received subscriber station basic capability request messages, calculating at the BS waiting times for every RS in the multi-hop relay system based on information about their positions and processing delays contained in received subscriber station basic capability request messages, and broadcasting from the BS subscriber station basic capability response messages to one or more RSs in the multi-hop relay system via dedicated downlink control channels.

Certain embodiments provide an apparatus for controlling transmission power by a base station (BS) in a multi-hop relay system. The apparatus generally includes logic for receiving channel quality information (CQI) of one or more downlink channels that correspond to one or more uplink channels power-controlled by the BS from a relay station (RS) closest to the BS using dedicated uplink control channel, and logic for sending one or more power-control messages, based on received CQI, for one or more of the uplink channels to the closest RS using a dedicated downlink control channel.

Certain embodiments provide an apparatus for controlling transmission power by a relay station (RS) in a centralized multi-hop relay system. The apparatus generally includes logic for sending channel quality information (CQI) of one or more downlink channels that correspond to one or more uplink channels power-controlled by a base station (BS) to the BS via one or more dedicated uplink control channels, logic for receiving, from the BS, one or more uplink channel power-control messages for one or more uplink channels power-controlled by the BS, and logic for relaying the one or more uplink channel power-control messages to sub-ordinate relay stations and to a subscriber station (SS) via one or more dedicated downlink control channels.

Certain embodiments provide an apparatus for controlling a transmission power by a relay station (RS) in a distributed multi-hop relay system. The apparatus generally includes logic for sending channel quality information (CQI) of one or more downlink channels that correspond to one or more uplink channels power-controlled by a super-ordinate RS to the super-ordinate RS using dedicated uplink control channel, logic for receiving one or more uplink channel power-control messages for one or more uplink channels power-controlled by the super-ordinate RS from the super-ordinate RS using dedicated downlink control channel, and logic for relaying the one or more uplink channel power-control messages for one or more uplink channels power-controlled by the super-ordinate RS to at least one of a sub-ordinate relay station via a dedicated downlink control channel.

Certain embodiments provide an apparatus for controlling a sleep mode of a subscriber station (SS) in a multi-hop relay system. The apparatus generally includes logic for sending a mobile sleep request message to a base station (BS) requesting an entry to the sleep mode via one or more relay stations using dedicated uplink control channels, logic for receiving a mobile sleep response message sent from the BS via the one or more relay stations using dedicated downlink control channels, and logic for entering the sleep mode at the SS according to information contained in the received mobile sleep response message.

Certain embodiments provide an apparatus for controlling a sleep mode of a subscriber station (SS) in a multi-hop relay system. The apparatus generally includes logic for receiving a mobile sleep request message sent from the SS for requesting an entry to the sleep mode via one or more relay stations using dedicated uplink control channels, and logic for sending from the BS a mobile sleep response message to the SS via the one or more relay stations using dedicated downlink control channels.

Certain embodiments provide an apparatus for performing multicast and broadcast services in a multi-hop relay system. The apparatus generally includes logic for receiving at a base station (BS) subscriber station basic capability request messages from every relay station (RS) in the multi-hop relay system via dedicated uplink control channels, logic for determining at the BS a maximum cumulative delay of every RS in the multi-hop relay system based on information about their positions and processing delays contained in received subscriber station basic capability request messages, logic for calculating at the BS waiting times for every RS in the multi-hop relay system based on information about their positions and processing delays contained in received subscriber station basic capability request messages, and logic for broadcasting from the BS subscriber station basic capability response messages to one or more RSs in the multi-hop relay system via dedicated downlink control channels.

Certain embodiments provide an apparatus for controlling transmission power by a base station (BS) in a multi-hop relay system. The apparatus generally includes means for receiving channel quality information (CQI) of one or more downlink channels that correspond to one or more uplink channels power-controlled by the BS from a relay station (RS) closest to the BS using dedicated uplink control channel, and means for sending one or more power-control messages, based on received CQI, for one or more of the uplink channels to the closest RS using a dedicated downlink control channel.

Certain embodiments provide an apparatus for controlling transmission power by a relay station (RS) in a centralized multi-hop relay system. The apparatus generally includes means for sending channel quality information (CQI) of one or more downlink channels that correspond to one or more uplink channels power-controlled by a base station (BS) to the BS via one or more dedicated uplink control channels, means for receiving, from the BS, one or more uplink channel power-control messages for one or more uplink channels power-controlled by the BS, and means for relaying the one or more uplink channel power-control messages to sub-ordinate relay stations and to a subscriber station (SS) via one or more dedicated downlink control channels.

Certain embodiments provide an apparatus for controlling a transmission power by a relay station (RS) in a distributed multi-hop relay system. The apparatus generally includes means for sending channel quality information (CQI) of one or more downlink channels that correspond to one or more uplink channels power-controlled by a super-ordinate RS to the super-ordinate RS using dedicated uplink control channel, means for receiving one or more uplink channel power-control messages for one or more uplink channels power-controlled by the super-ordinate RS from the super-ordinate RS using dedicated downlink control channel, and means for relaying the one or more uplink channel power-control messages for one or more uplink channels power-controlled by the super-ordinate RS to at least one of a sub-ordinate relay station via a dedicated downlink control channel.

Certain embodiments provide an apparatus for controlling a sleep mode of a subscriber station (SS) in a multi-hop relay system. The apparatus generally includes means for sending a mobile sleep request message to a base station (BS) requesting an entry to the sleep mode via one or more relay stations using dedicated uplink control channels, means for receiving a mobile sleep response message sent from the BS via the one or more relay stations using dedicated downlink control channels, and means for entering the sleep mode at the SS according to information contained in the received mobile sleep response message.

Certain embodiments provide an apparatus for controlling a sleep mode of a subscriber station (SS) in a multi-hop relay system. The apparatus generally includes means for receiving a mobile sleep request message sent from the SS for requesting an entry to the sleep mode via one or more relay stations using dedicated uplink control channels, and means for sending from the BS a mobile sleep response message to the SS via the one or more relay stations using dedicated downlink control channels.

Certain embodiments provide an apparatus for performing multicast and broadcast services in a multi-hop relay system. The apparatus generally includes means for receiving at a base station (BS) subscriber station basic capability request messages from every relay station (RS) in the multi-hop relay system via dedicated uplink control channels, means for determining at the BS a maximum cumulative delay of every RS in the multi-hop relay system based on information about their positions and processing delays contained in received subscriber station basic capability request messages, means for calculating at the BS waiting times for every RS in the multi-hop relay system based on information about their positions and processing delays contained in received subscriber station basic capability request messages, and means for broadcasting from the BS subscriber station basic capability response messages to one or more RSs in the multi-hop relay system via dedicated downlink control channels.

Certain embodiments provide a computer-program product for controlling transmission power by a base station (BS) in a multi-hop relay system, comprising a computer readable medium having instructions stored thereon, the instructions being executable by one or more processors. The instructions generally include instructions for receiving channel quality information (CQI) of one or more downlink channels that correspond to one or more uplink channels power-controlled by the BS from a relay station (RS) closest to the BS using dedicated uplink control channel, and instructions for sending one or more power-control messages, based on received CQI, for one or more of the uplink channels to the closest RS using a dedicated downlink control channel.

Certain embodiments provide a computer-program for controlling transmission power by a relay station (RS) in a centralized multi-hop relay system, comprising a computer readable medium having instructions stored thereon, the instructions being executable by one or more processors. The instructions generally include instructions for sending channel quality information (CQI) of one or more downlink channels that correspond to one or more uplink channels power-controlled by a base station (BS) to the BS via one or more dedicated uplink control channels, instructions for receiving, from the BS, one or more uplink channel power-control messages for one or more uplink channels power-controlled by the BS, and instructions for relaying the one or more uplink channel power-control messages to sub-ordinate relay stations and to a subscriber station (SS) via one or more dedicated downlink control channels.

Certain embodiments provide a computer-program for controlling a transmission power by a relay station (RS) in a distributed multi-hop relay system, comprising a computer readable medium having instructions stored thereon, the instructions being executable by one or more processors. The instructions generally include instructions for sending channel quality information (CQI) of one or more downlink channels that correspond to one or more uplink channels power-controlled by a super-ordinate RS to the super-ordinate RS using dedicated uplink control channel, instructions for receiving one or more uplink channel power-control messages for one or more uplink channels power-controlled by the super-ordinate RS from the super-ordinate RS using dedicated downlink control channel, and instructions for relaying the one or more uplink channel power-control messages for one or more uplink channels power-controlled by the super-ordinate RS to at least one of a sub-ordinate relay station via a dedicated downlink control channel.

Certain embodiments provide a computer-program for controlling a sleep mode of a subscriber station (SS) in a multi-hop relay system, comprising a computer readable medium having instructions stored thereon, the instructions being executable by one or more processors. The instructions generally include instructions for sending a mobile sleep request message to a base station (BS) requesting an entry to the sleep mode via one or more relay stations using dedicated uplink control channels, instructions for receiving a mobile sleep response message sent from the BS via the one or more relay stations using dedicated downlink control channels, and instructions for entering the sleep mode at the SS according to information contained in the received mobile sleep response message.

Certain embodiments provide a computer-program for controlling a sleep mode of a subscriber station (SS) in a multi-hop relay system, comprising a computer readable medium having instructions stored thereon, the instructions being executable by one or more processors. The instructions generally include instructions for receiving a mobile sleep request message sent from the SS for requesting an entry to the sleep mode via one or more relay stations using dedicated uplink control channels, and instructions for sending from the BS a mobile sleep response message to the SS via the one or more relay stations using dedicated downlink control channels.

Certain embodiments provide a computer-program for performing multicast and broadcast services in a multi-hop relay system, comprising a computer readable medium having instructions stored thereon, the instructions being executable by one or more processors. The instructions generally include instructions for receiving at a base station (BS) subscriber station basic capability request messages from every relay station (RS) in the multi-hop relay system via dedicated uplink control channels, instructions for determining at the BS a maximum cumulative delay of every RS in the multi-hop relay system based on information about their positions and processing delays contained in received subscriber station basic capability request messages, instructions for calculating at the BS waiting times for every RS in the multi-hop relay system based on information about their positions and processing delays contained in received subscriber station basic capability request messages, and instructions for broadcasting from the BS subscriber station basic capability response messages to one or more RSs in the multi-hop relay system via dedicated downlink control channels.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
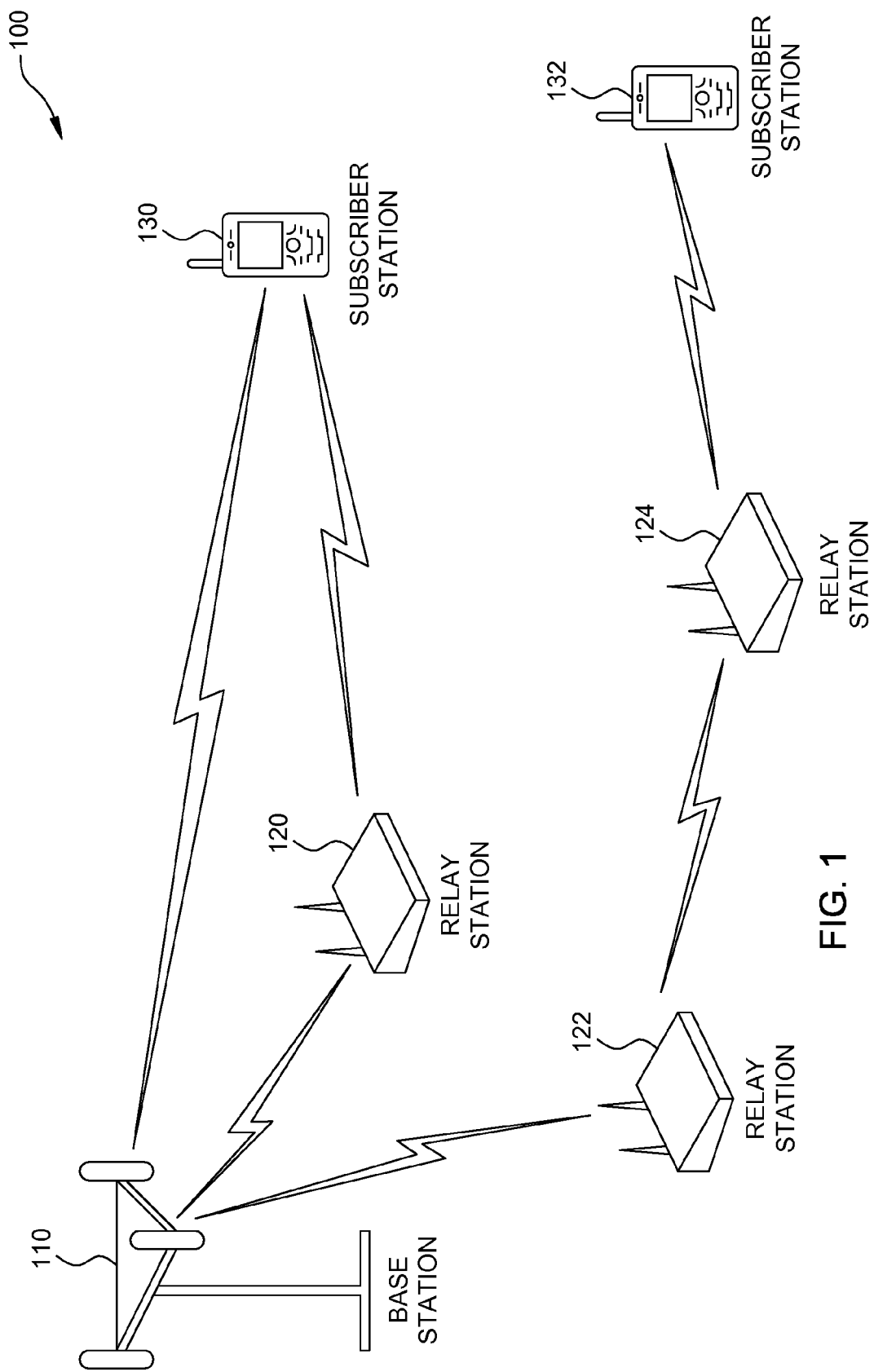
FIG. 1 shows a wireless communication system supporting multi-hop relay.

The word "exemplary" is used herein to mean "serving as an example, instance, or illustration." Any embodiment described herein as "exemplary" is not necessarily to be construed as preferred or advantageous over other embodiments.

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. Wireless systems have established themselves as a growing area in the field of telecommunications. The current trends and demands are to deliver multimedia services such as voice, video, interactive games, etc., with guaranteed Quality of Service (QoS). High data transmission capability is desirable in order to support high quality multimedia services.

A wireless communication system may support multi-hop relay in order to improve coverage and/or performance. With multi-hop relay, a base station (BS) may transmit data to a subscriber station (SS) via one or more relay stations. Each relay station (RS) may receive data from an upstream station (e.g., the base station or another relay station) and may retransmit the data to a downstream station (e.g., the subscriber station or another relay station). An upstream relay station may be referred to a super-ordinate relay station, and a downstream relay station may be referred to a sub-ordinate relay station. A transmission from one station to another station is considered as a hop. It may be desirable for each relay station to retransmit the data in an efficient manner.

A relay station may transmit control messages necessary for a management of the multi-hop relay network to either the subscriber station, to other relay stations or to the base station by periodically allocating uplink and downlink bandwidth resources to that specific relay station. The allocation of dedicated control channels allows relay stations to transmit control messages without requesting a channel bandwidth whenever there is a control message to transmit, which reduces transmission latency and improves overall performance of the multi-hop relay system.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 shows a wireless communication system 100 that supports multi-hop relay. For simplicity, FIG. 1 shows only one base station (BS) 110, three relay stations (RS) 120, 122 and 124, and two subscriber stations (SS) 130 and 132. In general, a system may include any number of base stations and any number of relay stations that support communication for any number of subscriber stations. A base station is a station that supports communication for subscriber stations. A base station may perform functions such as connectivity, management, and control of relay stations and subscriber stations. A base station may also be referred to as a Node B, an evolved Node B, an access point, etc. A relay station is a station that provides connectivity to other relay stations and/or subscriber stations. A relay station may also provide management and control of subordinate relay stations and/or subscriber stations. The air interface between a relay station and a subscriber station may be identical to the air interface between a base station and a subscriber station. A base station may be coupled to a core network via a backhaul (not shown in FIG. 1) in order to support various services. A relay station may or may not be directly coupled to the backhaul and may have limited functionality to support multi-hop communication via that relay station.

Subscriber stations may be dispersed throughout the system, and each subscriber station may be stationary or mobile. A subscriber station may also be referred to as a mobile station, a terminal, an access terminal, a user equipment, a subscriber unit, a station, etc. A subscriber station may be a cellular phone, a personal digital assistant (PDA), a wireless device, a wireless modem, a handheld device, a laptop computer, a cordless phone, etc. A subscriber station may communicate with a base station and/or a relay station via the downlink (DL) and uplink (UL). The downlink (or forward link) refers to the communication link from the base station or the relay station to the subscriber station. The uplink (or reverse link) refers to the communication link from the subscriber station to the base station or the relay station.

In the example shown in FIG. 1, base station 110 may communicate with subscriber station 130 via relay station 120. On the downlink, base station 110 may transmit data for subscriber station 130 to relay station 120, which may retransmit the data to subscriber station 130. On the uplink, subscriber station 130 may transmit data to relay station 120, which may retransmit the data to base station 110. Base station 110 and subscriber station 130 may also be able to communicate directly with one another.

Base station 110 may also communicate with subscriber station 132 via relay stations 122 and 124. On the downlink, base station 110 may transmit data for subscriber station 132 to relay station 122, which may retransmit the data to relay station 124, which may further retransmit the data to subscriber station 132. On the uplink, subscriber station 132 may transmit data to relay station 124, which may retransmit the data to relay station 122, which may further retransmit the data to base station 110. Base station 110 may not be able to communicate directly with subscriber station 132 and may rely on one or more relay stations for communication with subscriber station 132.

FIG. 1 shows an example of two-hop communication between base station 110 and subscriber station 130. FIG. 1 also shows an example of three-hop communication between base station 110 and subscriber station 132. In general, a base station and a subscriber station may communicate via any number of hops. In the following description, from the perspective of a given station, an upstream station is a station in an upstream path to a base station, and a downstream station is a station in a downstream path to a subscriber station.

Exemplary Allocation of Dedication Control Channels in Multi-Hop Relay System

Relay stations (RS) of a multi-hop relay system may typically need to transmit a large amount of control messages to a base station (BS) for the purpose of relay management. The allocation of dedicated control channels between relay stations and the base station may allow relay stations to transmit control messages with minimal time delay and thus to improve the overall performance of the multi-hop relay system. Dedicated control channels may be the main bandwidth resource in multi-hop relay systems to transmit uplink and downlink control signaling.

Figure 2:
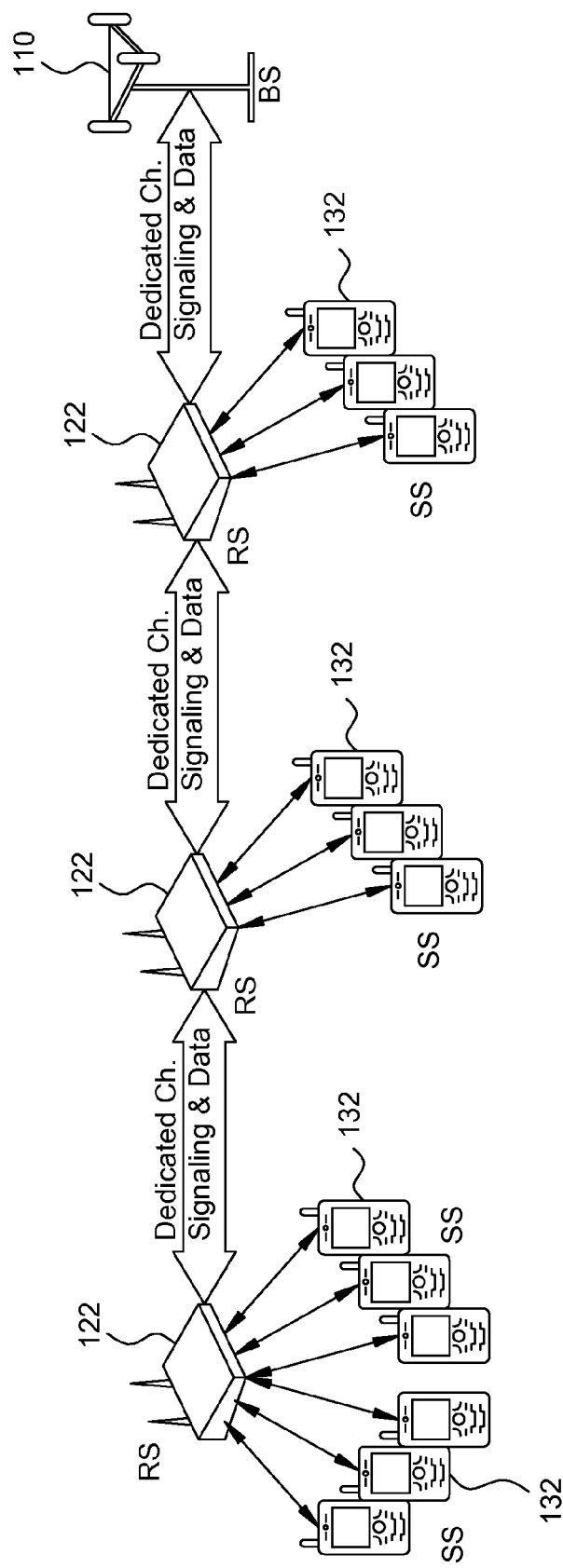
FIG. 2 shows a multi-hop transmission through dedicated channel allocation in accordance with certain embodiments of the present disclosure.

As illustrated in FIG. 2, dedicated control channels may be allocated between certain pairs of communication entities in the multi-hop relay system, e.g., between the BS 110 and the RS 122, and between pairs of relay stations 122 (i.e., between super-ordinate and sub-ordinate relay stations). Dedicated control channels may enable a tight coupling between the BS and all relay stations in the multi-hop relay system for effective serving of a subscriber station (SS) 132.

Dedicated control channels may be applicable to both distributed and centralized resource management. For centralized management, dedicated channels may be viewed as backhauls for control signaling and data traffic to the BS. For distributed management, every RS in the multi-hop relay system may locally manage signaling messages, and transmission requests can be aggregated to further reduce the amount of signaling messages required to go through the RS hops towards the BS.

Figure 3:
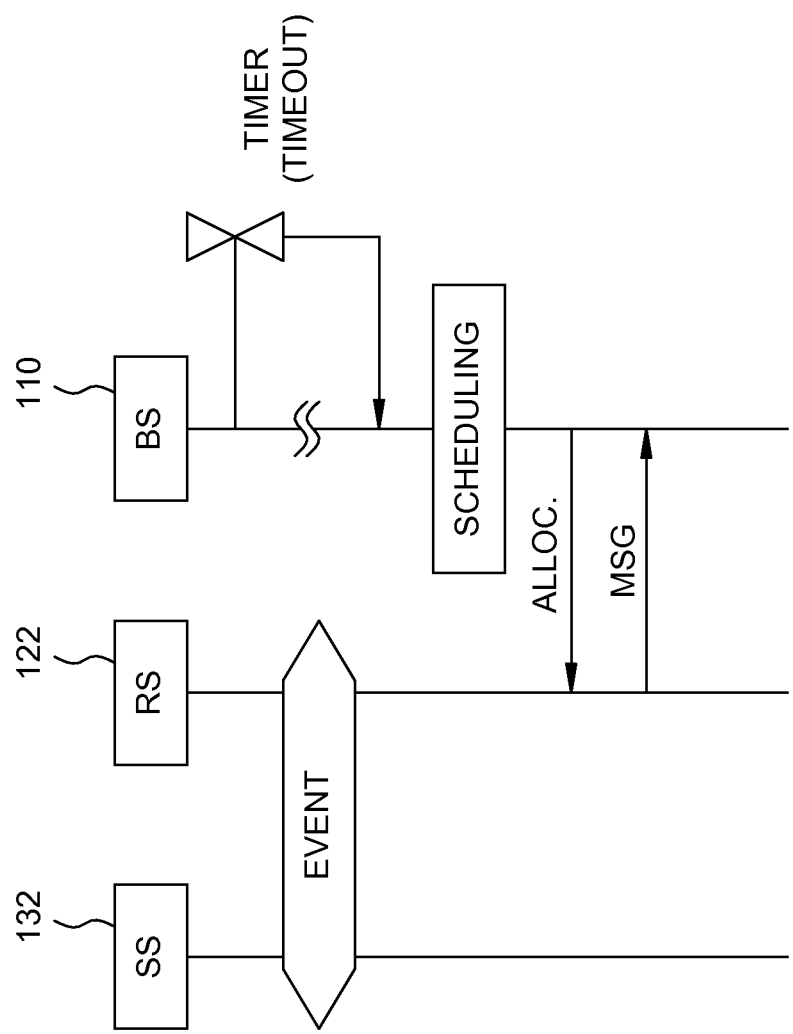
FIG. 3 shows example of a control message transmission from a relay station (RS) to a base station (BS) using a dedicated control channel in accordance with certain embodiments of the present disclosure.

FIG. 3 shows an example message flow for transmitting a control message from the RS 122 to the serving BS 110 using the dedicated control channel between these two communication entities of the multi-hop relay system. The RS 122 may be trying to transmit a management message created by an event between the RS 122 and the SS 132. After a network entry procedure of the RS 122 closest to the BS 110 and the message scheduling, the BS 110 may allocate the dedicated control channel to the RS 122 without an explicit request by the RS, as illustrated in FIG. 3.

If the BS 110 does not allocate the dedicated control channel to the RS 122, the RS may explicitly request allocation of the dedicated control channel by transmitting a request message. If necessary, the BS 110 may terminate or decrease the allocated bandwidth of the dedicated control channel without a request from the RS. In the same manner, the dedicated control channel may be allocated between any pair of super-ordinate and sub-ordinate RS of the multi-hop relay system, as illustrated in FIG. 2.

In order to reduce the overhead of allocating the dedicated control channel to every RS in the multi-hop relay system, the dedicated control channel may be allocated and released based on expected demand of the channel bandwidth. For example, in the case of an intra BS handover, the RS may request the allocation of the dedicated control channel when the RS detects that the SS is entering its communication range, and may release the dedicated control channel after the handover procedure is completed.

Dedicated control channels of the multi-hop relay system may be utilized for various purposes. For one embodiment of the present disclosure, dedicated control channels may be used for power-controlling communication entities in the multi-hop relay system. For another embodiment of the present disclosure, bandwidth resources of dedicated control channels may be employed to control a sleep mode at the SS. For yet another embodiment of the present disclosure, dedicated control channels of the multi-hop relay system may be exploited for multicast and broadcast services.

Exemplary Power Control in Multi-Hop Relay Systems Using Dedicated Control Channels In a multi-hop relay system, a serving BS or any super-ordinate RS may generate power control commands for corresponding sub-ordinate RS or an SS. It can be assumed that dedicated control channels may be allocated in the multi-hop relay system as illustrated in FIG. 2.

In order to perform a power control in the multi-hop relay system, channel quality information (CQI) may need to be known for the communication links being controlled. Furthermore, CQI may need to be broadcasted to all communication entities in the multi-hop relay system that make power control decisions about the corresponding communication links.

Figure 4:
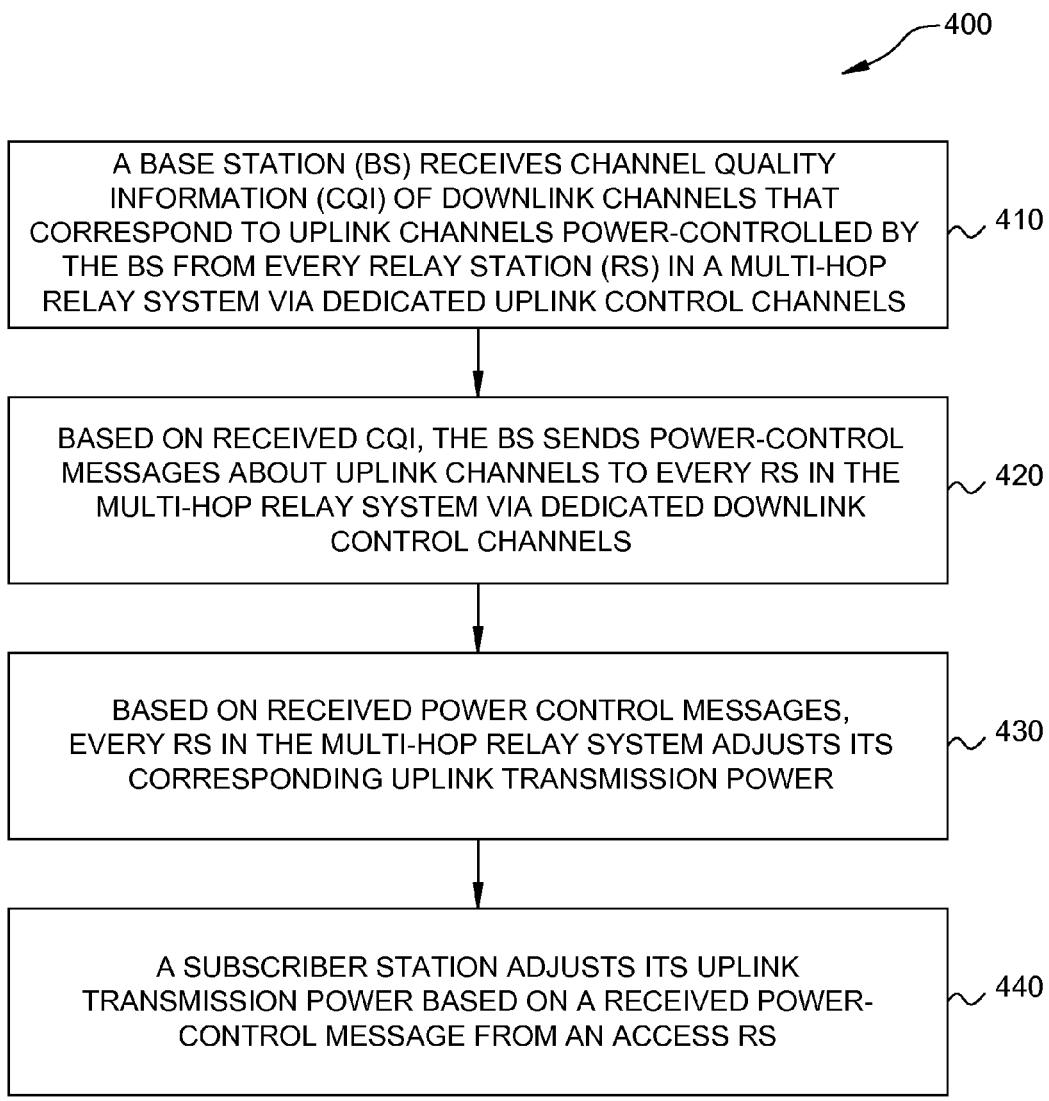
FIG. 4 illustrates example operations for utilizing dedicated control channels for power control in a centralized multi-hop relay system in accordance with certain embodiments of the present disclosure.

FIG. 4 illustrates example operations 400 for utilizing dedicated control channels for the purpose of power control in the multi-hop relay system. A centralized multi-hop relay system may be first assumed where the serving BS controls power of all uplink transmission channels.

At 410, the BS may receive from every RS in the multi-hop relay system the CQI of downlink channels that correspond to uplink channels power-controlled by the BS. Dedicated uplink control channels of the multi-hop relay system may be utilized to broadcast CQI. At 420, based on received CQI of downlink channels, the BS may send power-control messages related to corresponding uplink channels to every RS in the multi-hop relay system via dedicated downlink control channels. The access RS may also relay the power-control message to the SS via its downlink channel.

Based on received power control messages, every RS in the multi-hop relay system may adjust its corresponding uplink transmission power, at 430. At 440, the SS may also adjust the uplink transmission power based on the power-control message received from the access RS.

In the case of distributed power control, the BS and every RS in the multi-hop relay system may power control uplink channels they individually serve. If the transmission power of communication entities in the multi-hop relay system is controlled at individual super-ordinate RSs, every RS in the system may respond to the uplink power control messages from either the BS or the super-ordinate RS. Consequently, the SS may respond to the uplink power control message from the access RS.

Figure 5:
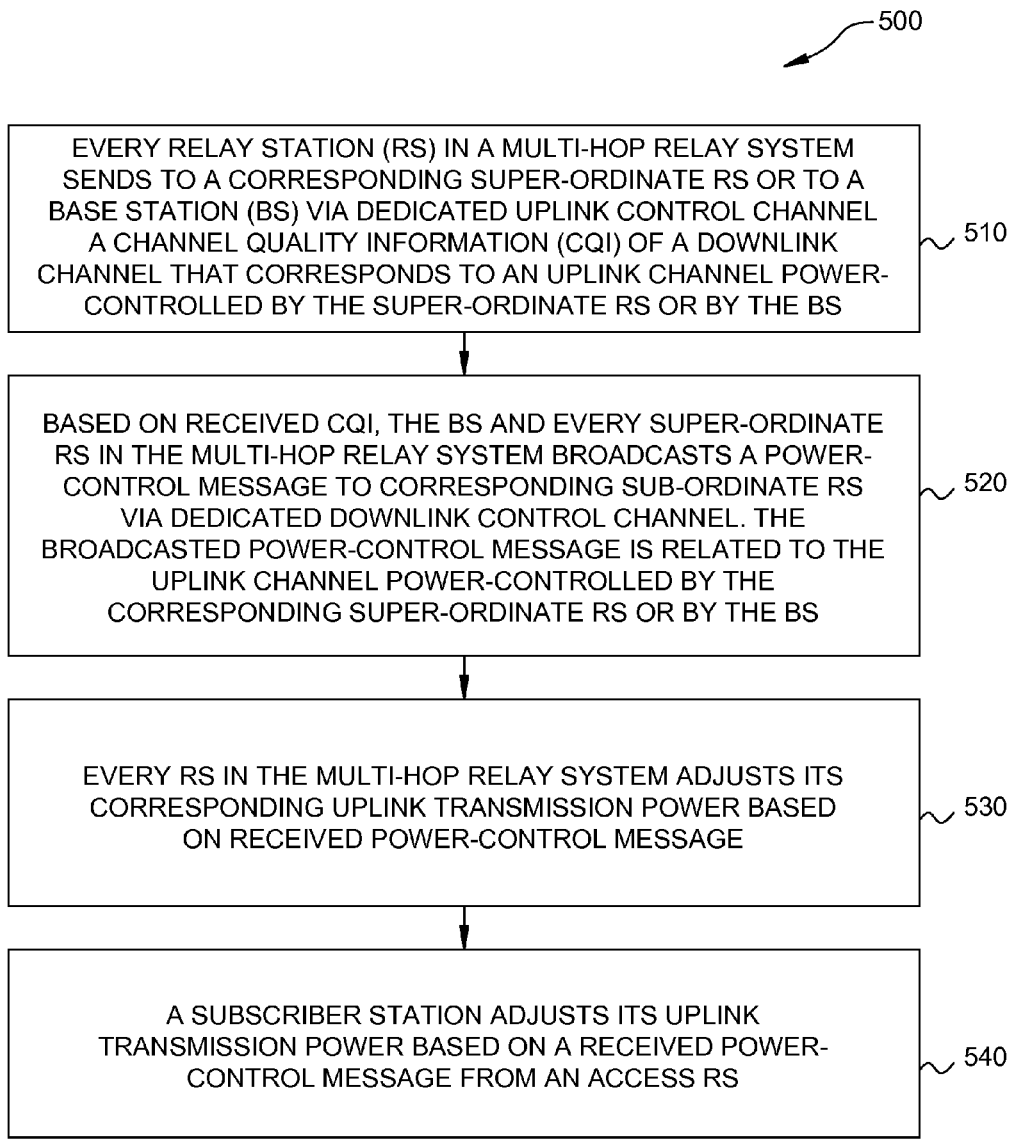
FIG. 5 illustrates example operations for utilizing dedicated control channels for power control in a distributed multi-hop relay system in accordance with certain embodiments of the present disclosure.

FIG. 5 illustrates example operations 500 for utilizing dedicated control channels for power control in the distributed multi-hop relay system. The process flow in this case may be similar as the process flow from FIG. 4 for the centralized multi-hop relay system. The only difference is that channels in the distributed multi-hop relay system may be also power-controlled by the super-ordinate RS, and not only by the BS.

At 510, every RS in the multi-hop relay system may send to corresponding super-ordinate RS (or to the BS) the CQI of downlink channels that correspond to uplink channels power-controlled by the super-ordinate RS or by the BS. Dedicated uplink control channels of the multi-hop relay system may be again utilized to broadcast CQI. At 520, based on received CQI, the BS and every RS in the multi-hop relay system may broadcast the power-control message to corresponding sub-ordinate RS via dedicated downlink control channel. Every broadcasted power-controlled message may be related to the uplink channel that is being power-controlled by the corresponding super-ordinate RS or by the BS. The access RS may also relay the power-control message to the SS via its downlink channel.

Based on received power-control messages, every RS in the multi-hop relay system may adjust its corresponding uplink transmission power, at 530. At 540, the SS may also adjust the uplink transmission power based on the received power-control message from the access RS.

Exemplary Control of Sleep Mode at Mobile Station in Multi-Hop Relay Systems Using Dedicated Control Channels A sleep mode of a subscriber station (SS) may be centrally controlled by a serving BS in the presence of centralized or distributed scheduling of a multi-hop relay system. It can again be assumed that dedicated control channels may be allocated in the multi-hop relay system along with certain bandwidth resources as illustrated in FIG. 2. In order to control the sleep mode of the SS, a MOB_SLP-REQ (mobile sleep request) message and a MOB_SLP-RSP (mobile sleep response) message may be relayed between the BS and the SS via relay stations of the multi-hop relay system by utilizing dedicated control channels.

Figure 6:
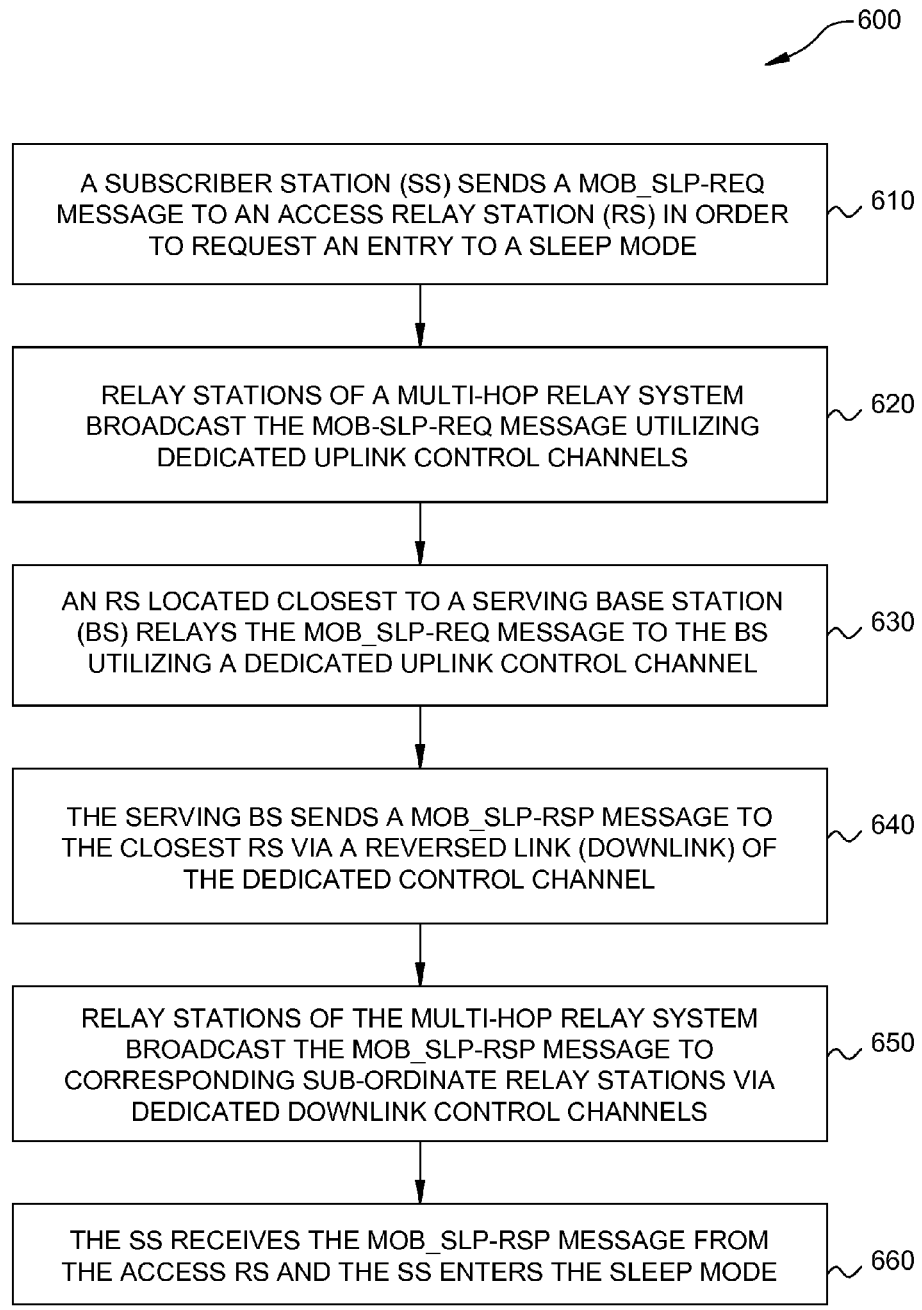
FIG. 6 illustrates example operations for utilizing dedicated control channels for controlling a sleep mode of a subscriber station (SS) in the multi-hop relay system in accordance with certain embodiments of the present disclosure.

FIG. 6 illustrates example operations 600 for utilizing dedicated control channels in the multi-hop relay system for controlling the sleep mode at the SS. At 610, the SS may send the MOB_SLP-REQ message to the access RS for requesting the sleep mode. At 620, the MOB-SLP-REQ message may be relayed via relay stations of the multi-hop relay system by utilizing dedicated uplink control channels.

At 630, the RS located closest to the BS may relay the MOB_SLP-REQ message to the BS by utilizing the uplink of a dedicated control channel. At 640, the serving BS may send the MOB_SLP-RSP message to the nearest RS via a reversed link (downlink) of the dedicated control channel. Following that, at 650, relay stations of the multi-hop relay system may relay the MOB_SLP-RSP message to corresponding sub-ordinate relay stations via dedicated downlink control channels. At 660, the SS may receive the MOB_SLP-RSP message from the access RS via its downlink channel and enter the sleep mode according to information contained in the received MOB_SLP-RSP message.

Figure 7:
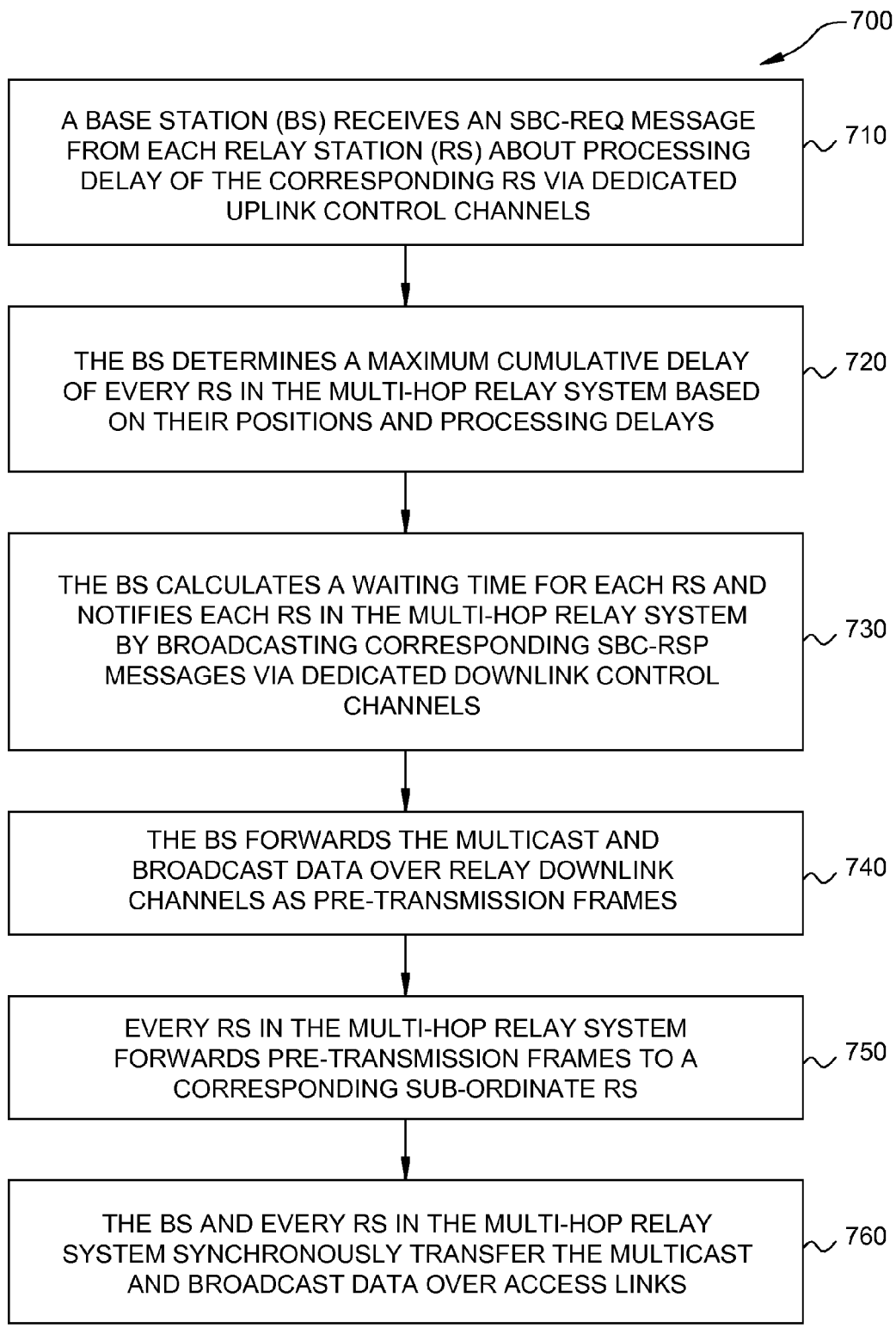
FIG. 7 illustrates example operations for utilizing dedicated control channels for performing multicast and broadcast services in the multi-hop relay system in accordance with certain embodiments of the present disclosure.

Exemplary Multicast and Broadcast Services in Multi-Hop Relay Systems Using Dedicated Control Channels FIG. 7 illustrates example operations 700 for performing multicast and broadcast services (MBS) in the multi-hop relay system by utilizing dedicated control channels. It can be again assumed that dedicated control channels may be allocated in the multi-hop relay system along with certain bandwidth resources as illustrated in FIG. 2. Each RS in the multi-hop relay system may report its processing delay by sending a SBC-REQ (Subscriber Station Basic Capability Request) message to the BS, at 710. The dedicated uplink control channel between the particular RS and the corresponding super-ordinate RS or the BS may be utilized for sending the SBC-REQ message.

At 720, the BS may determine a maximum cumulative delay of every RS in the multi-hop relay system based on their positions and processing delays. Subsequently, the BS may calculate a waiting time for each RS and notifies each RS in the multi-hop relay system by broadcasting corresponding SBC-RSP (Subscriber Station Basic Capability Response) messages, at 730. Dedicated downlink control channels of the multi-hop relay system may be utilized for sending SBC-RSP messages.

At 740, the BS may forward the MBS data over relay downlink channels as pre-transmission frames. At 750, every RS in the multi-hop relay system may forward pre-transmission frames to the corresponding sub-ordinate RS. Following the pre-transmission frames, the BS and all RSs in the multi-hop relay system may synchronously transfer the MBS data over corresponding access links, at 760.

Figure 4A:
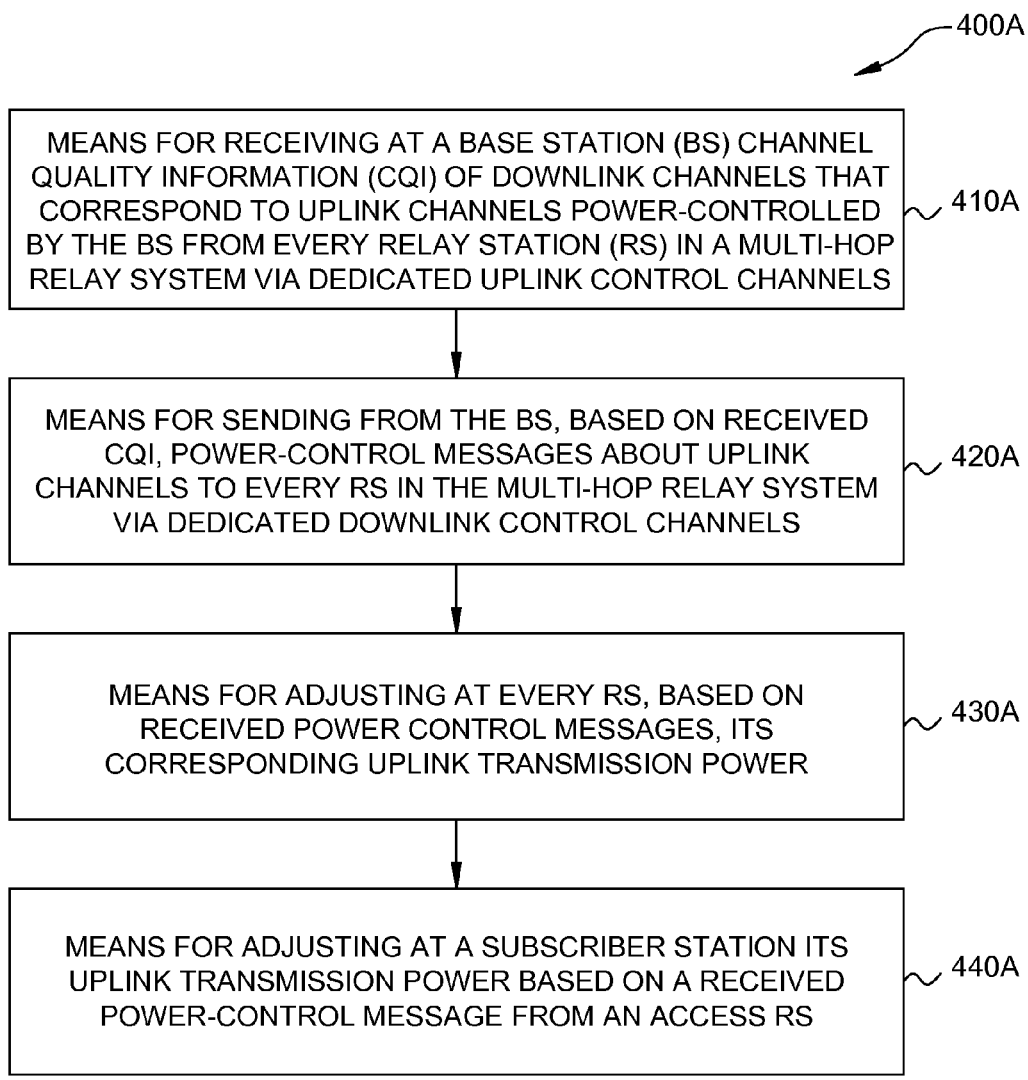
FIG. 4A illustrates example components capable of performing the operations illustrated in FIG. 4.
Figure 5A:
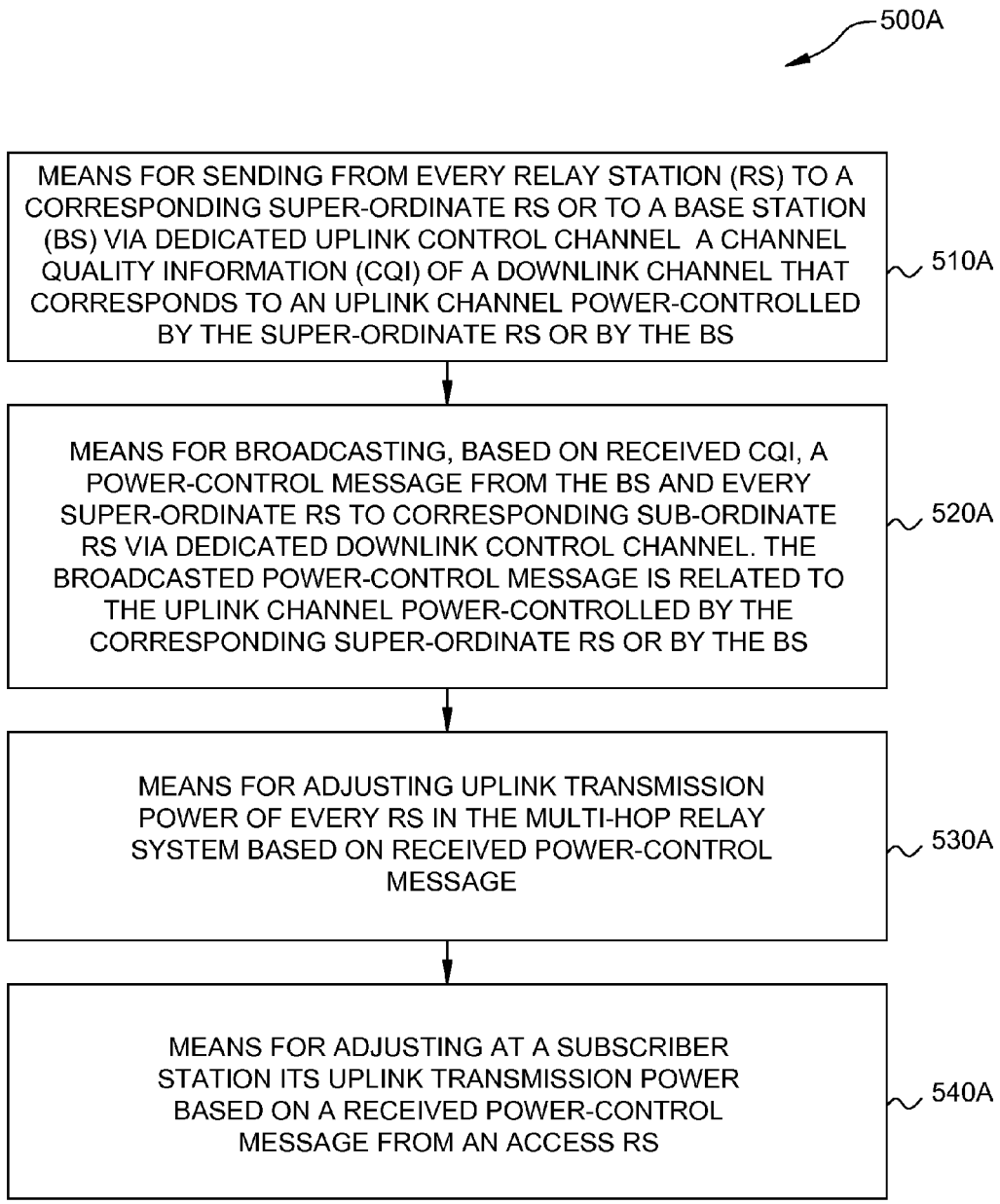
FIG. 5A illustrates example components capable of performing the operations illustrated in FIG. 5.
Figure 6A:
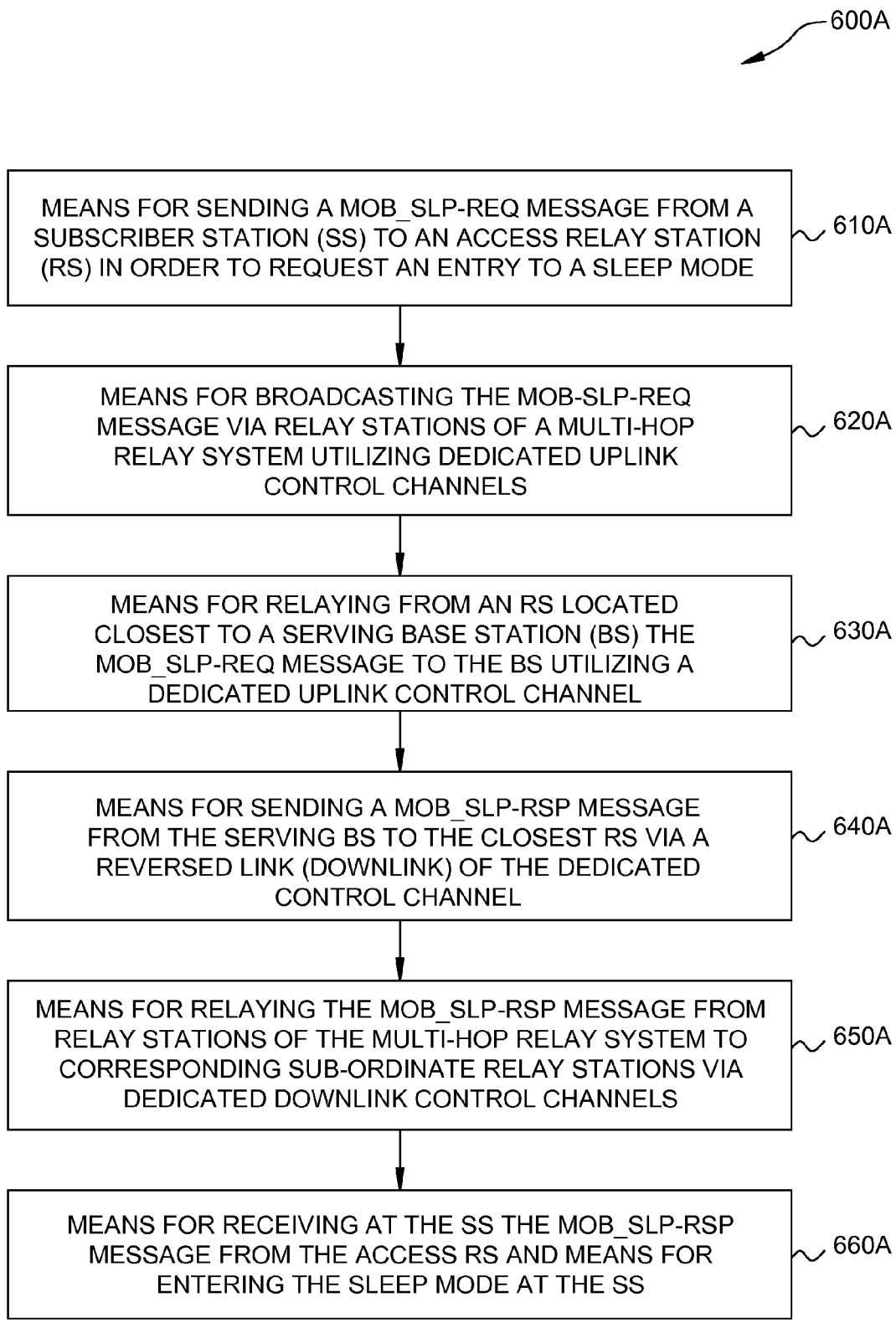
FIG. 6A illustrates example components capable of performing the operations illustrated in FIG. 6.
Figure 7A:
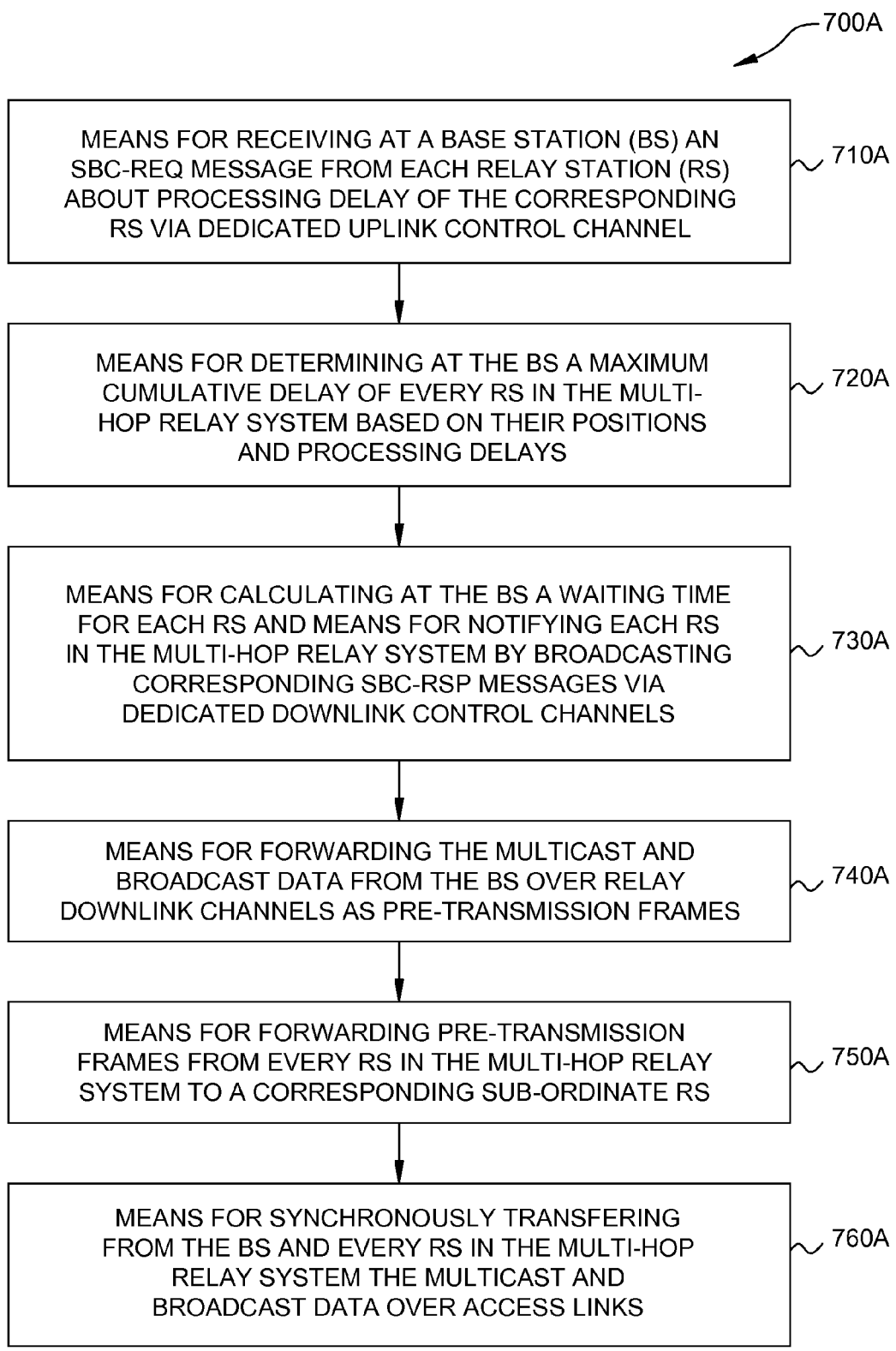
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 410-440 illustrated in FIG. 4 correspond to means-plus-function blocks 410A-440A illustrated in FIG. 4A. Similarly, blocks 510-540 illustrated in FIG. 5 correspond to means-plus-function blocks 510A-540A illustrated in FIG. 5A. Similarly, blocks 610-660 illustrated in FIG. 6 correspond to means-plus-function blocks 610A-660A illustrated in FIG. 6A. Similarly, blocks 710-760 illustrated in FIG. 6 correspond to means-plus-function blocks 710A-760A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for controlling a sleep mode of a subscriber station (SS) in a multi-hop relay system, comprising:
   sending a mobile sleep request message to a base station (BS) via one or more relay stations using dedicated uplink control channels, wherein at least one of the one or more relay stations locally manages signaling of the mobile sleep request message on at least one of the dedicated uplink control channels;
   receiving a mobile sleep response message sent from the BS via the one or more relay stations using dedicated downlink control channels, wherein the dedicated uplink and downlink control channels are adaptive based at least in part on expected demand of a channel bandwidth; and
   entering the sleep mode at the SS according to information contained in the received mobile sleep response message.

2. A method for controlling a sleep mode of a subscriber station (SS) in a multi-hop relay system, comprising:
   receiving, at a base station (BS), a mobile sleep request message and a subscriber station basic capability request message sent from the SS via a plurality of relay stations using dedicated uplink control channels, wherein the plurality of relay stations locally manage signaling of the mobile sleep request message and the subscriber station basic request message on at least one of the dedicated uplink control channels;
   determining, at the BS, a maximum cumulative delay of the plurality of relay stations based in part on the received subscriber station basic capability request message; and
   sending, from the BS, a mobile sleep response message and subscriber station basic capability response messages to the SS via the plurality of relay stations using dedicated downlink control channels, wherein the dedicated uplink and downlink control channels are adaptive based at least in part on expected demand of a channel bandwidth.

3. An apparatus for controlling a sleep mode of a subscriber station (SS) in a multi-hop relay system, comprising:
   a processor;
   memory in electronic communication with the processor; and
   instructions stored in the memory, the instructions being executable by the processor to:
      send a mobile sleep request message to a base station (BS) via one or more relay stations using dedicated uplink control channels, wherein at least one of the one or more relay stations locally manages signaling of the mobile sleep request message on at least one of the dedicated uplink control channels;
      receive a mobile sleep response message sent from the BS via the one or more relay stations using dedicated downlink control channels, wherein the dedicated uplink and downlink control channels are adaptive based at least in part on expected demand of a channel bandwidth; and
      entering the sleep mode at the SS according to information contained in the received mobile sleep response message.

4. An apparatus for controlling a sleep mode of a subscriber station (SS) in a multi-hop relay system, comprising:
   a processor;
   memory in electronic communication with the processor; and
   instructions stored in the memory, the instructions being executable by the processor to:
      receive, at a base station (BS), a mobile sleep request message and a subscriber station basic capability request message sent from the SS via a plurality of relay stations using dedicated uplink control channels, wherein the plurality of relay stations locally manage signaling of the mobile sleep request message and the subscriber station basic request message on at least one of the dedicated uplink control channels;
      determine, at the BS, a maximum cumulative delay of the plurality of relay stations based in part on the received subscriber station basic capability request message; and
      send, from the BS, a mobile sleep response message and subscriber station basic capability response messages to the SS via the plurality of relay stations using dedicated downlink control channels, wherein the dedicated uplink and downlink control channels are adaptive based at least in part on expected demand of a channel bandwidth.

5. An apparatus for controlling a sleep mode of a subscriber station (SS) in a multi-hop relay system, comprising:
   means for sending a mobile sleep request message to a base station (BS) via one or more relay stations using dedicated uplink control channels, wherein at least one of the one or more relay stations locally manages signaling of the mobile sleep request message on at least one of the dedicated uplink control channels;
   means for receiving a mobile sleep response message sent from the BS via the one or more relay stations using dedicated downlink control channels, wherein the dedicated uplink and downlink control channels are adaptive based at least in part on expected demand of a channel bandwidth; and
   means for entering the sleep mode at the SS according to information contained in the received mobile sleep response message.

6. An apparatus for controlling a sleep mode of a subscriber station (SS) in a multi-hop relay system, comprising:
   means for receiving, at a base station (BS), a mobile sleep request message and a subscriber station basic capability request message sent from the SS via a plurality of relay stations using dedicated uplink control channels, wherein the plurality of relay stations locally manage signaling of the mobile sleep request message and the subscriber station basic request message on at least one of the dedicated uplink control channels;

means for determining, at the BS, a maximum cumulative delay of the plurality of relay stations based in part on the received subscriber station basic capability request message; and means for sending, from the BS, a mobile sleep response message and subscriber station basic capability response messages to the SS via the plurality of relay stations using dedicated downlink control channels, wherein the dedicated uplink and downlink control channels are adaptive based at least in part on expected demand of a channel bandwidth.

7. A computer-program product for controlling a sleep mode of a subscriber station (SS) in a multi-hop relay system, comprising a non-transitory computer readable medium having instructions stored thereon, the instructions being executable by one or more processors and the instructions comprising:

instructions for sending a mobile sleep request message to a base station (BS) via one or more relay stations using dedicated uplink control channels, wherein at least one of the one or more relay stations locally manages signaling of the mobile sleep request message on at least one of the dedicated uplink control channels;

instructions for receiving a mobile sleep response message sent from the BS via the one or more relay stations using dedicated downlink control channels, wherein the dedicated uplink and downlink control channels are adaptive based at least in part on expected demand of a channel bandwidth; and instructions for entering the sleep mode at the SS according to the information contained in the received mobile sleep response message.

8. A computer-program product for controlling a sleep mode of a subscriber station (SS) in a multi-hop relay system, comprising a non-transitory computer readable medium having instructions stored thereon, the instructions being executable by one or more processors and the instructions comprising:

instructions for receiving, at a base station (BS), a mobile sleep request message and a subscriber station basic capability request message sent from the SS via a plurality of relay stations using dedicated uplink control channels, wherein the plurality of relay stations locally manage signaling of the mobile sleep request message and the subscriber station basic request message on at least one of the dedicated uplink control channels;

instructions for determining, at the BS, a maximum cumulative delay of the plurality of relay stations based in part on the received subscriber station basic capability request message; and instructions for sending, from the BS, a mobile sleep response message and subscriber station basic capability response messages to the SS via the plurality of relay stations using dedicated downlink control channels, wherein the dedicated uplink and downlink control channels are adaptive based at least in part on expected demand of a channel bandwidth.

* * * * *